J. HIMMES.
PLATFORM SCALE.
APPLICATION FILED JULY 18, 1910.
987,627.
Patented Mar. 21, 1911.
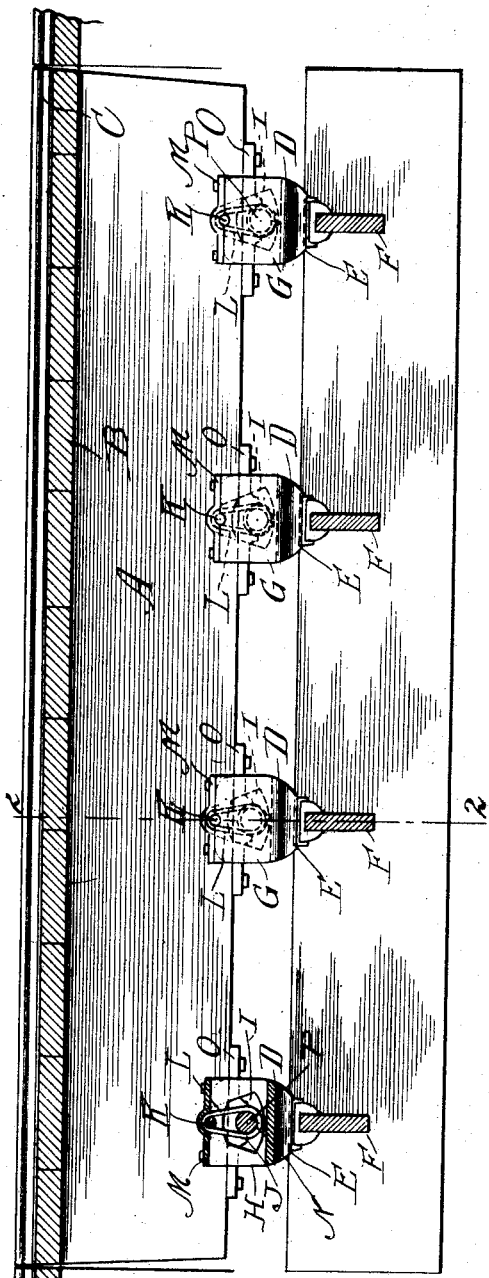
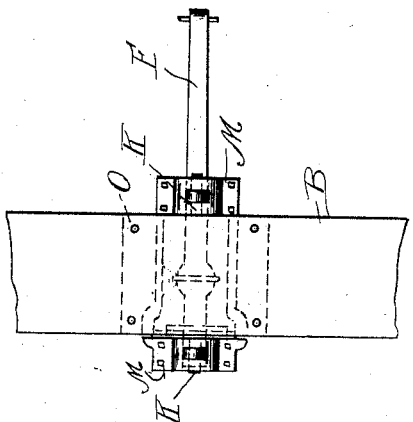
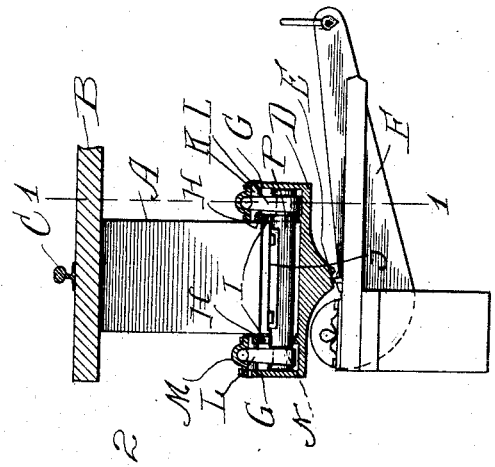
Witnesses:
H. C. L. White
R. A. White
Inventor:
Jacob Himmes
By Rudolph M. Fox Atty.

UNITED STATES PATENT OFFICE.

JACOB HIMMES, OF CHICAGO, ILLINOIS.

PLATFORM-SCALE.

987,627.  Specification of Letters Patent.  Patented Mar. 21, 1911.

Application filed July 18, 1910. Serial No. 572,478.

*To all whom it may concern:*

Be it known that I, JACOB HIMMES, citizen of the United States, residing at Chicago, in the county of Cook and State of Illinois, have invented certain new and useful Improvements in Platform-Scales; and I do hereby declare the following to be a full, clear, and exact description of the invention, such as will enable others skilled in the art to which it appertains to make and use the same.

This invention relates to a novel construction in a scale platform particularly adapted for large scales such as are used for weighing loaded wagons and railroad cars, the object being to provide means whereby the upper or super-structure of the platform will be rendered capable of limited movement relatively to the bearing feet supporting the same, and consists in the features of construction and combinations of parts hereinafter fully described and claimed.

In the accompanying drawings illustrating this invention Figure —1— is a view in side elevation partly in section on the line 1—1 of Fig. —2— of the platform portion of a scale showing the main levers, the bearing feet supported thereon and the scale platform supported upon said bearing feet. Fig. —2— is a detail transverse section on the line 2—2 of Fig. —1—. Fig. —3— is a detail plan view showing one of said bearing feet.

The object of my invention is to provide means whereby relative movement of the scale platform and bearing feet is permitted so as to relieve the scale pivots from the strains ordinarily imposed thereon and maintain the same constantly in proper position to maintain the accuracy of the scale.

The scale platform which is here represented by beams A upon which flooring or the like, indicated at B, is mounted and upon which rails C are supported, is mounted upon the bearing feet D of the scale; the latter being supported in the usual manner upon the scale pivots E carried by the main levers F in the usual manner. The said bearing feet D are provided at their ends with flanges G and H, the latter being provided with substantially triangular openings I through which the end portions of rollers P project. Supported upon the upper ends of said flanges H and G are pins K upon which the links L are supported, the latter receiving the said end portions of said roller P in their lower ends; said rollers being thus suspended from said pins K. Said links L are held against movement longitudinally of said pins K by means of cap plates M mounted upon the said upper ends of said flanges G and H in any well-known manner. The said end portions of said rollers P are annularly grooved as at N to receive the said links L to prevent the escape of said rollers therefrom and to maintain said rollers normally out of contact at their ends with the inner faces of said flanges G. The beams A are provided on their lower faces with plates O provided between their ends with concave recesses J in which said rollers P are received, said recesses J being of greater radius than said rollers so as to permit the latter to move therein to a limited extent. The said platform A—B is thus suspended by means of the links L and rollers P from said pins K and by reason of the triangular openings in the flanges H and the free spaces between the ends of said rollers J and the inner walls of the flanges G said platform A—B is capable of limited movement longitudinally and laterally relatively to the bearing feet D without affecting the pivots E, as will be obvious.

I claim as my invention:

1. In scales of the kind specified, the combination with the bearing feet, of rollers supporting said platform, and links carrying said rollers suspended from said bearing feet.

2. In scales of the kind specified, the combination with the bearing feet, of rollers supporting said platform, pins on said bearing feet, and links suspended from said pins and carrying said rollers.

3. In scales of the kind specified, the combination with the bearing feet, and the scale platform, of end flanges on said bearing feet, pins supported on the upper ends of said flanges, links depending from said pins, and rollers hung in said links, said platform resting on said rollers.

4. In scales of the kind specified, the combination with the bearing feet, and the scale platform, of end flanges on said bearing feet, flanges parallel therewith and disposed inwardly thereof, pins spanning the upper ends of said flanges, links depending from said pins between said flanges, and rollers passing at their ends through openings in the inner flanges hung in said links, said platform resting on said rollers.

In testimony whereof I have signed my name in presence of two subscribing witnesses.

JACOB HIMMES.

Witnesses:
RUDOLPH WM. LOTZ,
M. M. BOYLE.

Copies of this patent may be obtained for five cents each, by addressing the "Commissioner of Patents, Washington, D. C."